United States Patent
Garcia et al.

(10) Patent No.: US 12,488,197 B1
(45) Date of Patent: Dec. 2, 2025

(54) SYSTEMS AND METHODS FOR ADVERSARIAL ANNOTATIONS

(71) Applicant: Wells Fargo Bank, N.A., San Francisco, CA (US)

(72) Inventors: Gabriela Garcia, Fate, TX (US); Weicheng Liu, Weddington, NC (US); Hope Ann Staroselsky, Denver, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 289 days.

(21) Appl. No.: 18/305,551

(22) Filed: Apr. 24, 2023

(51) Int. Cl.
*G06F 40/40* (2020.01)
*G06Q 30/015* (2023.01)

(52) U.S. Cl.
CPC ........... *G06F 40/40* (2020.01); *G06Q 30/015* (2023.01)

(58) Field of Classification Search
CPC .............................. G06F 40/40; G06Q 30/015
See application file for complete search history.

(56) References Cited

U.S. PATENT DOCUMENTS

| | | | |
|---|---|---|---|
| 7,548,847 B2 | 6/2009 | Acero et al. | |
| 10,380,236 B1* | 8/2019 | Ganu | G06F 40/169 |
| 11,645,449 B1* | 5/2023 | Ritchie | G06Q 30/0282 715/230 |
| 2007/0150801 A1 | 6/2007 | Chidlovskii et al. | |
| 2019/0034822 A1* | 1/2019 | Farré Guiu | G06N 5/022 |
| 2019/0171950 A1 | 6/2019 | Srivastava | |
| 2020/0250580 A1* | 8/2020 | Harman | G06N 7/01 |
| 2020/0302340 A1* | 9/2020 | Durand | G06N 3/045 |
| 2023/0162021 A1* | 5/2023 | Chorakhalikar | G06N 3/045 706/15 |

OTHER PUBLICATIONS

Kholkar, "Building the Unbiased and Continually Self-Improving Machine," TCS, Believed to be published online at least as early as Sep. 28, 2020 at: https://web.archive.org/web/20220118014301/ https://www.tcs.com/perspectives/articles/building-the-unbiased-and-continually-self-improving-machine, 9 pages.

Ponnusamy, "Feedback-Based Self-Learning in Large-Scale Conversational AI Agents," The Thirty-Second Innovative Applications of Artificial Intelligence Conference, 2020, vol. 34, No. 08: AAAI-20, pp. 13180-13187, Association for the Advancement of Artificial Intelligence, Available online at: https://ojs.aaai.org/index.php/AAAI/article/view/7022.

* cited by examiner

Primary Examiner — Bhavesh M Mehta
Assistant Examiner — Eunice Lee
(74) Attorney, Agent, or Firm — Kilpatrick Townsend & Stockton LLP

(57) ABSTRACT

Systems and methods for operating an artificial intelligence and machine learning model to generate annotations of data and to generate training datasets is disclosed. One disclosed system includes one or more processors configured to: assign a task to a machine learning model; receive an output from the machine learning model associated with the task; compare the output to task data associated with a user performing the assigned task; and when there is a difference between the output of the machine learning model and the task data, generate an annotation.

17 Claims, 6 Drawing Sheets

SYSTEMS AND METHODS FOR ADVERSARIAL ANNOTATIONS

FIELD OF INVENTION

The present disclosure generally relates to artificial intelligence and machine learning systems for annotation generation, and more particularly to systems and methods for self-improving artificial intelligence and machine learning to generate dataset annotations.

BACKGROUND

Companies implement artificial intelligence and machine learning systems to make business processes more efficient. Artificial intelligence and machine learning systems are generally well equipped to assist workers in high volume and repetitive tasks, however training these systems is often labor intensive and expensive. To provide useful outputs, artificial intelligence and machine learning systems rely on their training data being high quality and up to date. Current artificial intelligence and machine learning systems would benefit from systems and tools that improve the efficiency of producing high quality and up to date training data.

SUMMARY

According to certain embodiments, a method for an adversarial annotation system comprises: assigning a task to a machine learning model; receiving an output from the machine learning model associated with the task; comparing the output to task data associated with a user performing the assigned task; and when there is one or more differences between the output of the machine learning model and the task data, generating an annotation. According to further embodiments, the method for an adversarial annotation system may include retraining the machine learning model using the annotation.

According to another embodiment, a non-transitory computer readable medium may comprise program code, which when executed by one or more processors, causes the one or more processors to: assign a task to a machine learning model; receive an output from the machine learning model associated with the task; compare the output to task data associated with a user performing the assigned task; and when there is one or more differences between the output of the machine learning model and the task data, generate an annotation. According to further embodiments, the instructions may further comprise: retraining the machine learning model using the annotation.

According to another embodiment, a system for adversarial annotations may comprise: one or more processors and memory that stores instructions that, when executed by the one or more processors, cause the one or more processors to: assign a task to a machine learning model; receive an output from the machine learning model associated with the task; compare the output to task data associated with a user performing the assigned task; and when there is one or more differences between the output of the machine learning model and the task data, generate an annotation. According to further embodiments, the instructions may further comprise: retraining the machine learning model using the annotation.

BRIEF DESCRIPTION OF THE DRAWINGS

A full and enabling disclosure is set forth more particularly in the remainder of the specification. The specification references the following appended figures.

DETAILED DESCRIPTION

Figure 1:
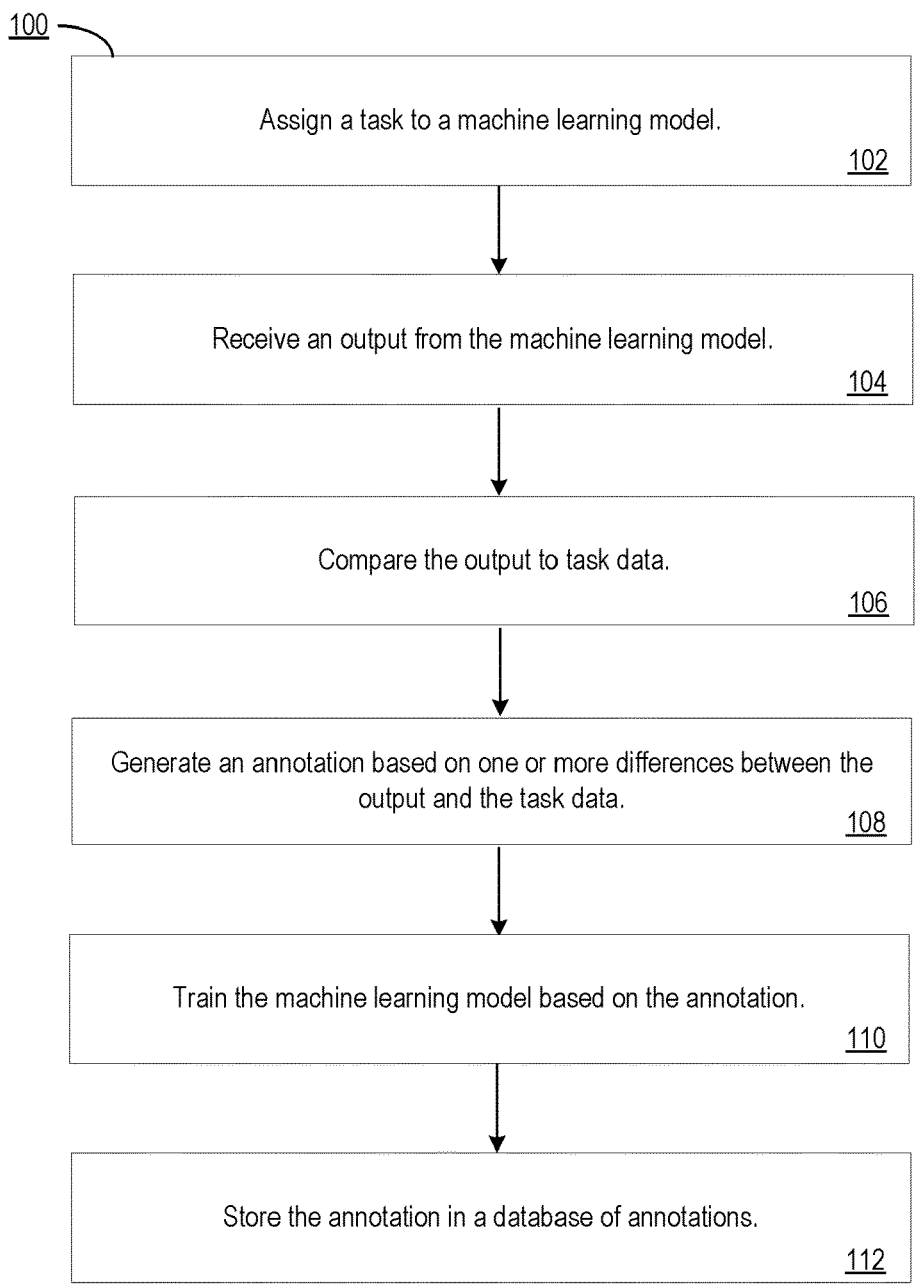
FIG. 1 illustrates a flow chart for an example method of operating an adversarial annotation system, particularly illustrating generating and storing annotations according to one embodiment.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Examples of an Adversarial Annotation System

In one illustrative example, an adversarial annotation system comprises an application for generating annotations to train an artificial intelligence or machine learning model. The application compares outputs of a machine learning model to data associated with a user completing a task, and generates an annotation based on the differences. The user and the adversarial annotation system may use annotations to train the artificial intelligence or machine learning model.

The artificial intelligence or machine learning model may be a component of the adversarial annotation system or may be a separate system. A user may assign a task to the application or machine learning model, such as identifying whether a conversation is associated with a complaint, identifying whether a message is a request for a product or service, or identifying inconsistencies in documents such as a loan application. The artificial intelligence or machine learning model completes the task and provides the application with an output. The output of the artificial intelligence or machine learning system may be the completion of the task, a simulation of completing the task, or data associated with the completion or simulation of the task. For example, the artificial intelligence or machine learning system may be assigned a task such as to transfer a call to the correct department of an enterprise. The artificial intelligence or machine learning model may transfer the call itself or simulate the transfer of the call. In some examples, the artificial intelligence or machine learning model may run in parallel with a user completing tasks. For example, the user and the machine learning model may both receive a task at the same time and reach solutions in parallel. In further examples, the artificial intelligence or machine learning system may receive a pre-recorded call and simulate transferring the call by outputting a prediction of which department to transfer the call.

The application compares the output of the artificial intelligence or machine learning system to task data associated with user completion of the task. The task data may include actions a user took to execute the task or may include a model response for the task. For example, enterprise regulations may require transfer of all callers with issues related to logging into an account to an Information Technology (IT) services department. The task data may include the actions a user took to transfer the call and may further include an explanation for why the user chose to transfer the call to the IT services department.

The application may compare the output to the task data by comparing attributes or elements associated with the output and task data, such as what task is requested and the steps taken by the user or the machine learning model in executing the task. For example, attributes of the output and task data may include a list of executed steps, textual explanations and predictions of reasoning, and descriptions of actions taken by the machine learning model and a user. The application may compare further attributes, or elements, of the data such as metadata representing the file size of the data, length of time in determining an output or response, and computer resource usage in executing an action (e.g., what computer systems were used to execute a task, how much processing power was required to execute a task).

The application may compare the output to the task data using Natural Language Processing (NLP) techniques. The application may use NLP techniques to analyze contents of the output and the task data and determine differences between the output and the task data. For example, when the application is comparing an output with task data to determine whether a customer is raising a complaint in an email, the application may analyze the output and task data to identify information indicating a service is not working or the customer had a poor experience at a business, such as terminology used by the customer, tone of the customer's voice or writing.

In further examples, the application may compare detailed analysis, contradictions, and detailed results of the output and task data to information from a database. The database may operate as a central knowledge hub of detailed analysis, contradictions, and detailed results of past tasks executed by machine learning models or workers of the enterprise.

Detailed analysis may include analysis by a machine learning model or a user on an input to the machine learning model, an output of the machine learning model, and task data. The detailed analysis may include description of the machine learning model's logic in generating an output. The detailed analysis may further include descriptions of the input including predictions of an output and descriptions ranking importance of information from the input. For example, the input may be a recording of a customer describing a problem with the customer's bank account. The customer may describe the problem with the bank account, such as difficulties withdrawing from the account at an ATM. The customer may incorrectly request transfer to an IT department when the correct department to handle the issue is a customer services department. The detailed analysis of the recording may include a description that ranks the customer's description of the problem as more important than the customer's request to be transferred to the IT department because the request for transfer to the IT department would not resolve the customer's issue. Detailed analysis of the task data may further include a description of a user's logic in completing the task.

Contradictions may include inconsistencies between the output of the machine learning model, and the task data, as well as descriptions of logical inconsistencies or fallacies in the logic of the machine learning model. Detailed results may include descriptions identifying whether the output of the machine learning model or actions executed by a user from the task data resolved a customer's problem. The detailed results may further include descriptions identifying inefficiencies in executed actions or resources used by the machine learning model or a user.

By storing the detailed analysis, contradictions, and detailed results in a central database, the enterprise may more easily adapt training data to changes in enterprise procedures, while also following regulation required traceability of changes in procedures and reduce human bias. For example, by storing the detailed analysis, contradictions, and detailed results in a central database, the enterprise may adjust the detailed analysis, contradictions, and detailed results at the central database for operating the enterprise without requiring large scale revisions to the training data. The enterprise may adjust the weight of detailed analysis, contradictions, and detailed results stored at the database to adjust machine learning model outputs. In one such example, the enterprise may determine that analysis of a customer email using terms such as "broken user interface" indicate that the customer is referring to a technical issue, and not a complaint, and may establish that the customers be directed to IT services instead of a complaint hotline. The database of analysis, contradictions, and detailed results may also link the analysis, contradictions, and detailed results to preferred actions by the enterprise. For example, the enterprise may have a rule that whenever a customer complaint mentions an employee by name, the complaint should immediately be forwarded to the named employee and his or her direct supervisor.

The application generates an annotation based on one or more differences between the output and the task data. In some examples, the annotation may be a textual description of the differences between the output and the task data. The differences may include different actions taken by the artificial intelligence or machine learning model and actions taken by a user. For example, the artificial intelligence or machine learning model may determine that a customer's email is a complaint based on information from the email, such as use of particular terms "upset" or "broken service" or information regarding the subject of the email determined by the application using Natural Language Processing techniques. The artificial intelligence or machine learning model may determine to forward the customer's email to a customer retention department, while the user may determine to forward the customer's email to an IT department to try to fix the customer's problem. In some examples, the annotation may also include reference to the training data used by the artificial intelligence or machine learning model to generate the output, making the logic of the artificial intelligence or machine learning model traceable. Identifying the training data used by the artificial intelligence or machine learning model allows the application and the user to trace the logic of the artificial intelligence or machine learning model. By making the logic traceable, users may identify potential biases in the training data that may introduce bias into the output and correct the bias such as by replacing portions of the training data.

The application may use the annotation as an input to train the artificial intelligence or machine learning model to improve future outputs. In some examples, the application may store the annotations in the database. The database may arrange and store the annotations according to the associated task and based on detailed analysis, contradictions, and detailed results of the annotations. By storing the annotations according to associated tasks and detailed analysis, contradictions, and detailed results of the annotations, the application may curate training datasets from the annotations associated with particular tasks.

The application may include a self-improving artificial intelligence and machine learning model that uses the annotations generated by the system to improve the system. For example, the machine learning model may use recursive learning algorithms and techniques such as recursive neural networks to improve accuracy and to reduce bias in the annotations by retraining the machine learning model and updating past training datasets from updated annotations.

Exemplary Method of Operating an Adversarial Annotation System

FIG. 1 is a flowchart showing illustrative method 100 for operating an adversarial annotation system to generate and store annotations. In some examples, some of the steps in the flow chart of FIG. 1 are implemented in program code executed by a processor, for example, the processor in a general-purpose computer, mobile device, or server. In some examples, these steps are implemented by a group of processors. In some examples the steps shown in FIG. 1 are performed in a different order or one or more steps may be skipped. Alternatively, in some examples, additional steps not shown in FIG. 1 may be performed.

At block 102, the method 100 assigns a task to a machine learning model. A user may choose to train a machine learning model to execute a particular task, or collection of tasks, such as determining whether a conversation is a complaint, whether an email is a request for additional services, or which department of an enterprise to direct users.

At block 104, the method 100 receives an output from the machine learning model. The output may be a prediction of how to execute the task assigned to the machine learning model. In some examples, the output may be a list of steps to execute the task. In further examples, the output may be a simulation of the execution of tasks. For example, the task may be to identify whether a pre-recorded phone call of a customer's complaint is directed to services provided by an employee, or issues with a product, and to direct the user to the appropriate business department to handle the complaint.

At block 106, the method 100 compares the output to task data. In some examples, the adversarial annotation system uses Natural Language Processing (NLP) to compare the output to task data. For example, the adversarial annotation system may use Natural Language Processing (NLP) to determine the content of the task data and the output and compare them. The task data may include model solutions to a task. In some examples the task data may be the actions taken by a user in executing a particular or similar task. In an example where the task includes determining whether a prerecorded call is a complaint, the task data may include an answer indicating whether the prerecorded call is a complaint as well as the reasoning of the user, such as by citing to keywords of the call supporting the reasoning. The task data may also include the steps the user took after determining whether the prerecorded call was a complaint such as the user forwarding an email to an enterprise department to handle complaints.

The comparison may include the steps taken by the machine learning model and user in executing the task, as well as the outcome. The comparison may further include determining whether the machine learning model correctly executed the task, and whether the machine learning model executed the task efficiently. For example, to test the machine learning model's efficiency, the comparison may include the machine learning model's use of processing resources and runtime, which may show inefficiencies in the machine learning model.

At block 108, the method 100 generates an annotation based on one or more differences between the output and the task data. For example, the method may include identifying differences in the steps taken by the machine learning model and a user, such as the order of steps taken, resources used by the user and the machine learning model, and the outcome of the user's and the machine learning model's actions. In one such example, a user may determine from the language of an email that a customer is filing a complaint and may forward the email to a customer retention department. The machine learning model may determine from the language of the email that the customer is instead requesting help with an error in service and may recommend calling the respective service department. In such example, the differences identified in the annotation may include the language identified by the user and the machine learning model to determine actions to take, such as language from the email indicating which enterprise department to contact, and the medium (in the above example, by phone or by email) to contact the department.

At step 110, the method 100 trains the machine learning model based on the annotation. Users or the adversarial annotation system may input the annotation as training data to the machine learning model, which the machine learning model may use to improve the accuracy of its outputs. In some examples, users may label the annotation, and edit the annotation. By labeling the annotation, users may provide emphasis or weight on elements of the annotation that were important in the reasoning or were dispositive in the outcome of the task. For example, a user may label an annotation to emphasize the meanings of particular words, such as the differences between "shall" and "may" which may drastically alter the meaning of an email. In another example, the user may label annotations for other grammatical nuances, such as by providing meanings to idioms, or informal speech (e.g., slang). In further examples, the annotation may be unlabeled and inputted automatically by the system, allowing the machine learning model to learn with less user supervision.

At step 112, the method 100 stores the annotation in a database of annotations. In some examples, the method may include storing the annotation based on the task associated with the annotation. For example, annotations associated with determining whether voicemails are complaints may be stored with annotations of similar tasks to allow for construction of training datasets of annotations.

Figure 2:
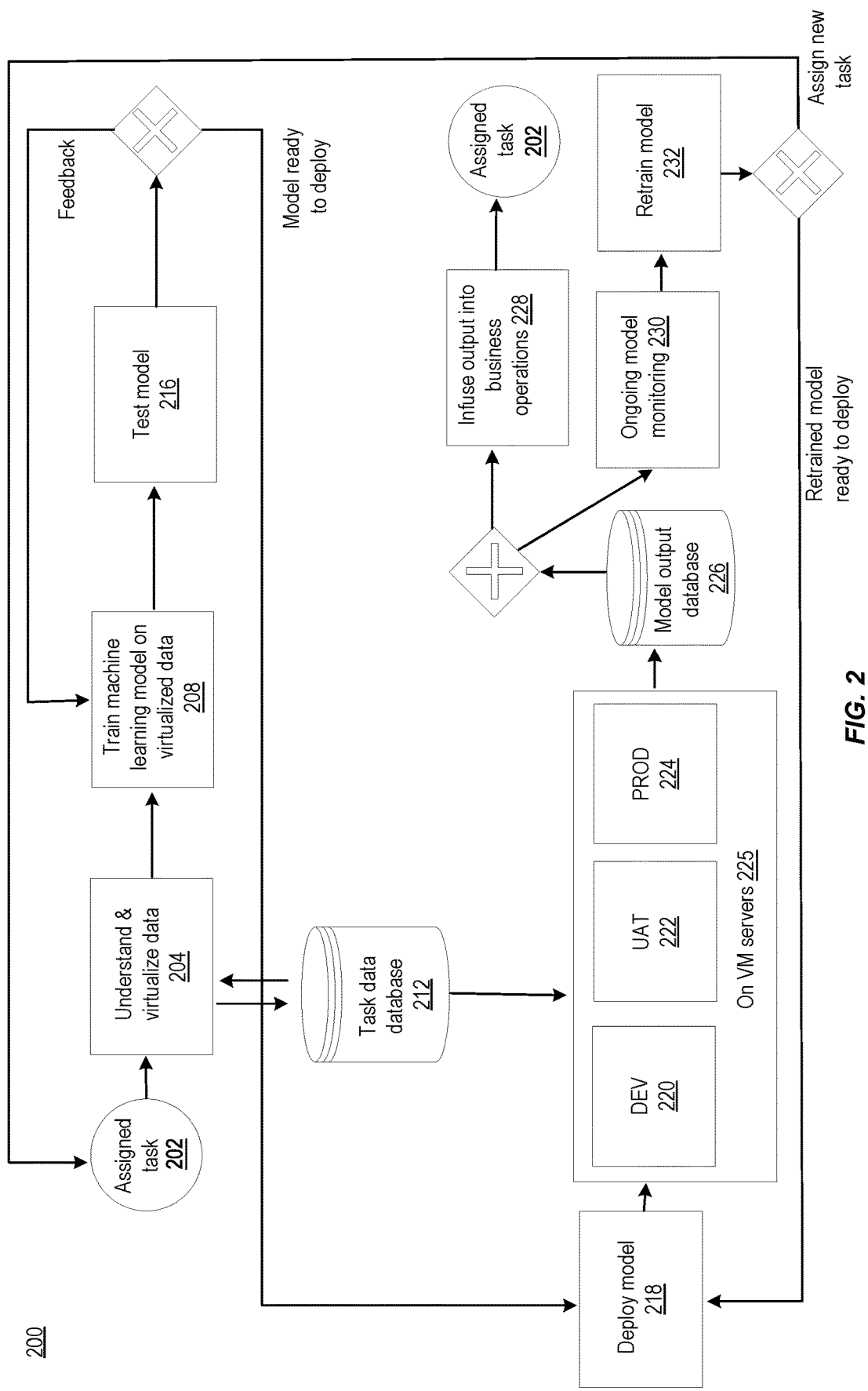
FIG. 2 illustrates a flow chart for an example method of operating an adversarial annotation system, particularly illustrating the training and updating of machine learning models according to one embodiment.

Illustrative Example of Operating an Adversarial Annotation System and Integrating the Machine Learning Model into Enterprise Products FIG. 2 illustrates an exemplary process 200 of an enterprise operating an adversarial annotation system and integrating the adversarial annotations into enterprise resources. The process may begin with an assigned task 202. The assigned task 202 is the action or task the user assigns the adversarial annotation system to execute. The adversarial annotation system may have multiple assigned tasks, such as determining whether customer interactions with the enterprise are complaints, whether the customer interactions are requests for products and services, and whether the customer interactions are directed to a particular individual or division of an enterprise. For example, a customer interaction may be a voicemail left by a customer, an email sent by the customer, and a transcript or voice recording of a conversation with a customer. In some examples, the assigned task 202 may include multiple steps, such as to determine whether a customer interaction is a customer account issue and resolve the issue. For example, if the customer interaction is directed to an issue with an account having the wrong billing address, the task may include directing the customer to a URL or generating a URL where the user may update his or her billing address.

The process 200 may continue to step 204, wherein the adversarial annotation system reviews data associated with the assigned task and virtualizes further data associated with the assigned task. Virtualizing the data may include gathering data from various repositories or databases of the enterprise. For example, Step 204 includes sending the data associated with the assigned task to a task data database 212 and receiving assigned task data and completed task data for similar tasks from the task data database 212. The completed task data is data associated with actions taken by users or other machine learning models in completing or attempting to complete a task. In some examples, the completed task data may include actions taken, whether real or simulated, by the same machine learning model in past use cases. For example, an enterprise may have internal rules for how to respond to complaints, such as by forwarding complaints of employees to the direct supervisor of the employee. The completed task data may include the steps of how the enterprise handles these tasks such as by populating a template email with relevant data associated with a complaint, searching an employee database for the direct supervisor of an employee, and then sending the email to the direct supervisor. In some examples, the adversarial annotation system may review the completed task data and the data associated with the assigned task using Natural Language Processing (NLP) to provide detailed analysis, contradictions, and detailed results of the task data and data associated with the assigned task.

The process may continue to step 208, wherein the system trains the machine learning model using the completed task data. The training step may include providing training datasets of completed task data as an input to the machine learning model. The machine learning model is then tested at step 216 by evaluating the output of the machine learning model in response to the assigned task. For example, the user may input the data associated with the assigned task (e.g., the assigned task data) to the machine learning model. The machine learning model output may include the actions that the machine learning model executes in response to the assigned task data. A user or the adversarial annotation system may evaluate the output by comparing the output to completed task data from the task data database. The user or adversarial annotation system may identify differences between the completed task data and the output of the machine learning model and generate an annotation based on the differences. The user or adversarial annotation system may input the annotations to the machine learning model as training data to retrain the machine learning model and to generate an updated output based on the retrained machine learning model. The user or adversarial annotation system may compare the updated output to the completed task data and the prior output. The process of retraining the machine learning model may be a feedback loop that continues until the output of the machine learning model falls within a predetermined tolerance of error from the completed task data. The predetermined tolerance of error may be an amount of error in the machine learning model's output that a user sets as being allowable for the model or for a particular task. The system may determine error in the output by quantifying the differences between the output and the completed task data, and when the determined value falls within an acceptable range or is less than a preset threshold, the system may determine that the machine learning model does not require additional retraining. By allowing differences in the output and the completed task data, users may avoid overfitting the machine learning model. In other examples, a user may set a number of times for the feedback loop to occur or may evaluate the outputs of the machine learning model to determine when to stop testing and training the machine learning model.

The process may continue to step 218, wherein the system deploys the machine learning model. Deployment of the machine learning model includes sending the machine learning model to development teams of the enterprise to integrate the machine learning model into enterprise resources. For example, the machine learning model may undergo various development processes at the enterprise to prepare the machine learning model for integration into the enterprise's products. By way of example, process 200 represents graphically the development process (DEV) 220 wherein software developers integrate the machine learning model into a product, the testing process (UAT) 222 wherein the software developers or users beta test the product, and product release (PROD) 224 wherein the software developers release the updated product integrating the machine learning model for use by the enterprise or customers. For example, the machine learning model may be integrated into a chatbot system for directing users to different departments, into an email server system to sort customer emails based on content, or into a banking application to assist users with service issues. In some examples, the development process 220, testing process 222, and the product release 224 may all occur on an enterprise's virtual machine (VM) servers 225. For example, the enterprise may use virtual machine (VM) servers 225 to emulate a hardware or software environment on which the product integrating the machine learning model may operate. In other examples, parts of the development process (DEV) 220, testing process (UAT) 222, and the product release (PROD) 224 may occur in other environments, such as on a local computing system or network.

The process 200 may proceed to step 226, where the machine learning model is saved in a model output database. The model output database may include a database of past trained machine learning models. The database may store the machine learning models based on use case, version, date of creation, and accuracy of the model's output. For example, when enterprise procedures, the business structure of the enterprise, or business regulations change past models may become outdated. In one such example, the enterprise may change procedures related to handling complaints. For example, the enterprise may determine to forward complaints about employees to a Human Resources (HR) department instead of to an employee's direct supervisor. In such an example, the enterprise may store past machine learning models directed to the former enterprise rules, including tags indicating a version number of the machine learning model and changes in enterprise procedures.

The process 200 may continue to either or both step 228 and step 230. In step 228, the enterprise begins using the machine learning model in the enterprise's operations for assigned task 202. In step 230, the enterprise may continue to monitor the machine learning model for accuracy in outputs. This may include performing probability sampling to monitor the accuracy of the machine learning model's outputs. When the probability sampling indicates that the machine learning model outputs include errors outside of the predetermined threshold, the process may proceed to step 232, wherein the adversarial annotation system retrains the machine learning model. The retraining process may include using past annotations or additional completed task data as training data for the machine learning model. The retrained machine learning model may then go through software development and testing processes to integrate the retrained machine learning model into the enterprise products. When the enterprise determines to use the machine learning model for additional assigned tasks, the process may return to 202 to restart the process 200 for the next or new assigned task.

An Exemplary Adversarial Annotation System

Figure 3:
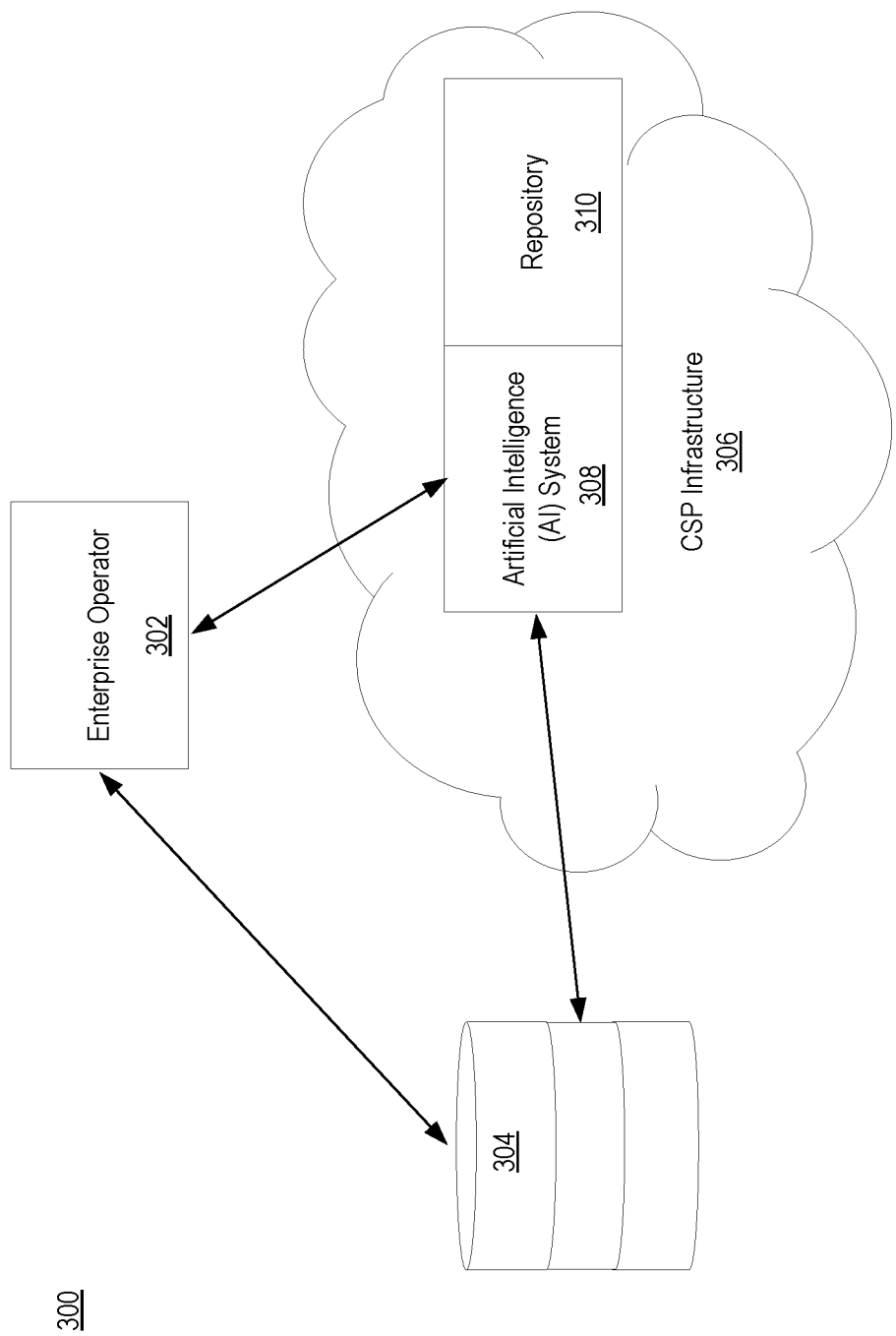
FIG. 3 illustrates an example adversarial annotation system running on cloud service provider (CSP) infrastructure and communicating with a database and enterprise operation according to one embodiment.

FIG. 3 illustrates an exemplary adversarial annotation system 300. The adversarial annotation system 300 includes an artificial intelligence (AI) system 308 which includes the artificial intelligence or machine learning model operating on cloud service provider (CSP) infrastructure 306. The artificial intelligence (AI) system 308 may include connections to multiple databases or repositories, represented by 304 and 310. For example, repository 310 may include various servers and databases operating on cloud service provider (CSP) infrastructure 306. Repository 310 may store copies or past versions of the artificial intelligence (AI) system and machine learning models. Database 304 may store data associated with training and maintaining the artificial intelligence (AI) system such as task data, use case data, annotations, model solutions to assigned tasks, and enterprise rules. For example, enterprise rules may include a preset list of keywords indicating tasks that should be executed according to particular enterprise rules. For example, the enterprise may include a rule that any email mentioning "fraud" or "theft" always be sent to a security department of the enterprise. In further examples, the database 304 may represent a second storage location of the data stored at repository 310, such as backups of repository 310.

The artificial intelligence (AI) system 308 may receive and transmit data to database 304 and repository 310. For example, the artificial intelligence (AI) system 308 may receive task data and use case data from either database 304, repository 310, or both. The artificial intelligence (AI) system 308 may further store its output or past versions at database 304 and repository 310.

The enterprise operator 302 represents an enterprise's interactions with the artificial intelligence (AI) system 308, database 304, and repository 310. For example, the enterprise operator 302 may be a single user or a plurality of users. For example, the enterprise operator 302 may represent software developers integrating the artificial intelligence (AI) system 308 into products or services of the enterprise, such as integrating the artificial intelligence (AI) system 308 into a chatbot. Enterprise operator 302 may further include a data analyst reviewing outputs of the artificial intelligence (AI) system 308 to determine whether the artificial intelligence (AI) system's 308 outputs fall outside a predetermined threshold of error. In some examples, the enterprise operator 302 may determine whether to retrain the artificial intelligence (AI) system 308.

Illustrative Example of Annotation Generation

Figure 4A:
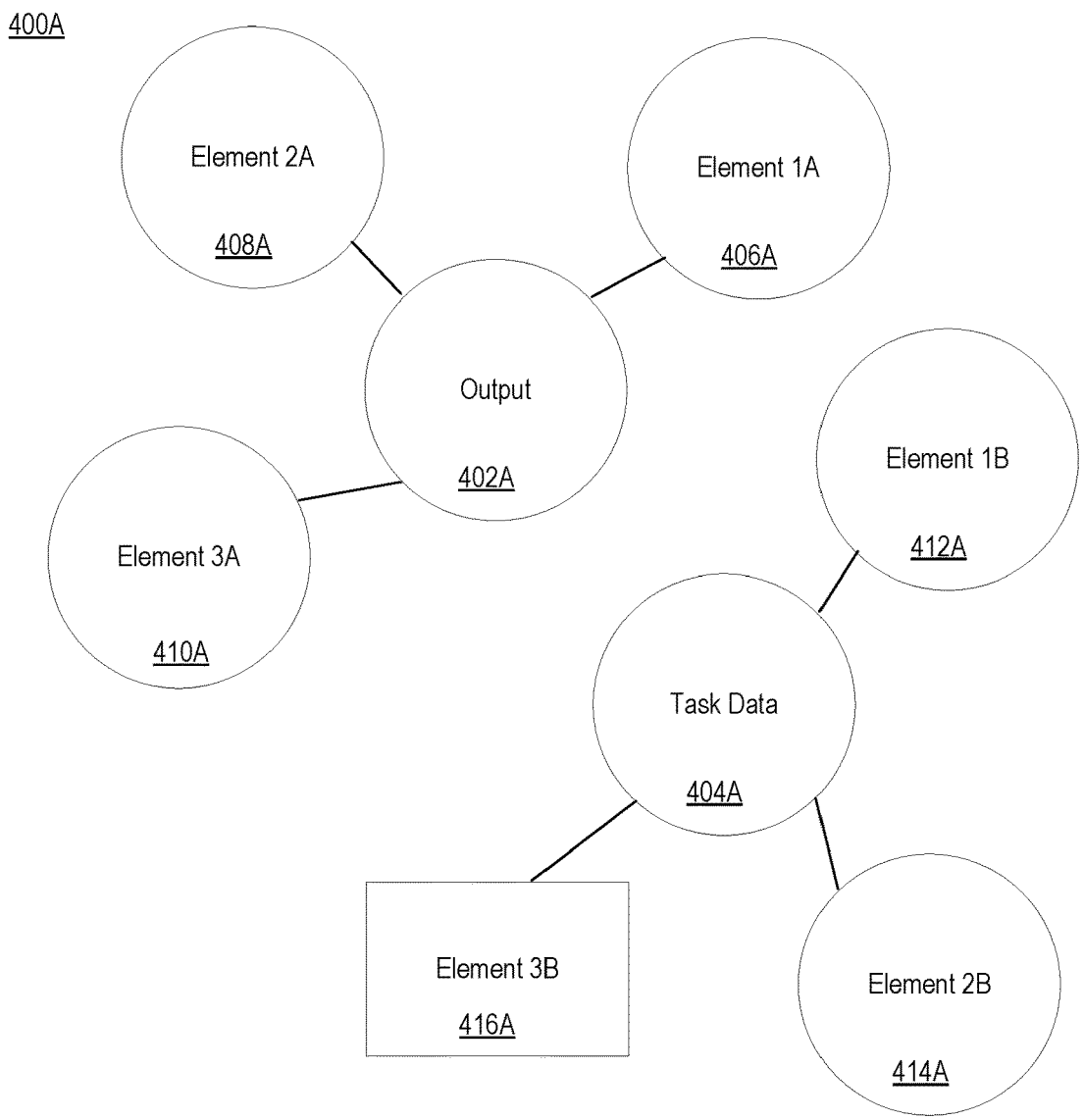
FIGS. 4A and 4B illustrate a graphical representation of the comparison of a machine learning model output and task data, as well as the generation of annotations based on the comparison according to one embodiment.
Figure 4B:
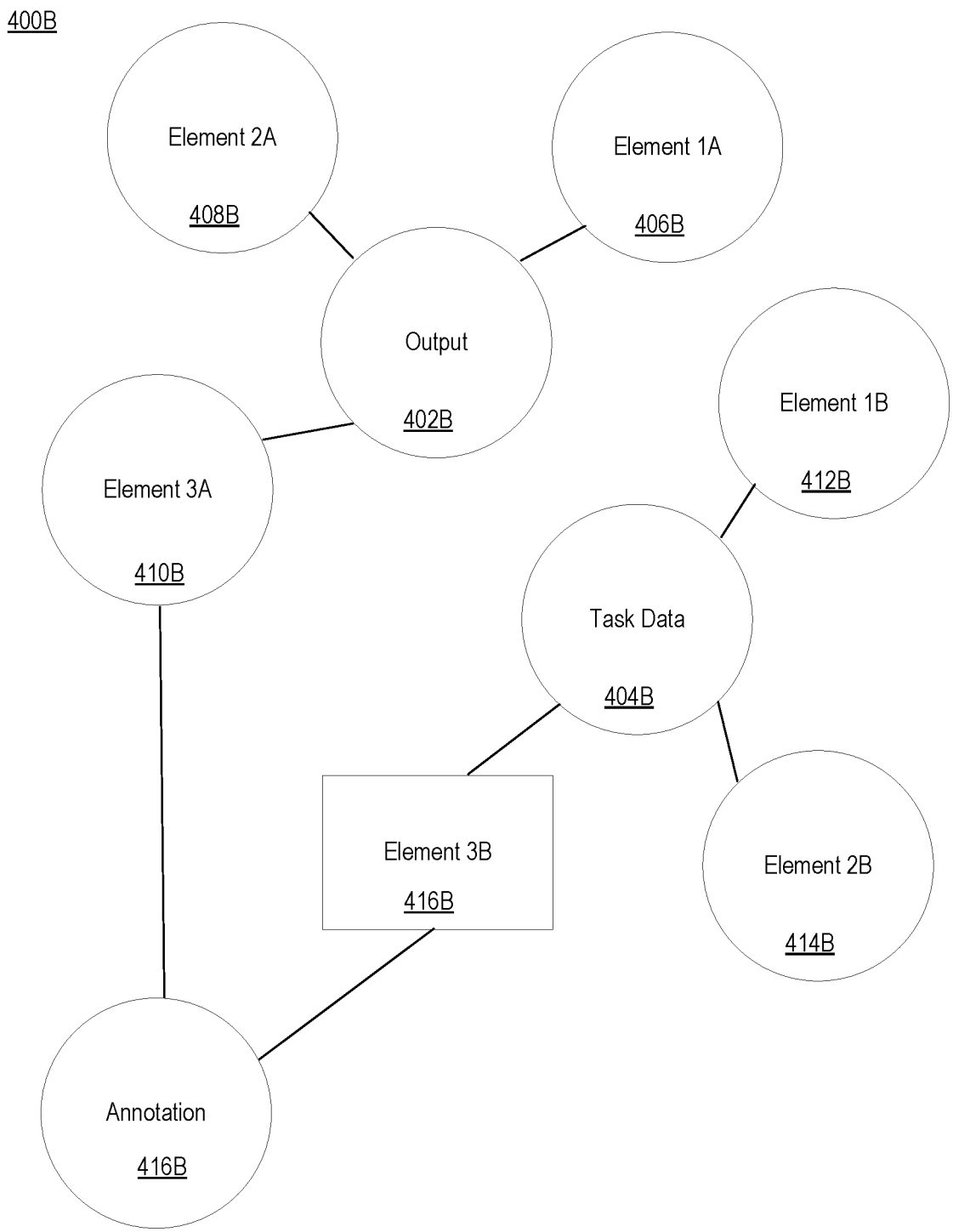

FIG. 4A and FIG. 4B graphically illustrate the annotation process. FIG. 4A illustrates a machine learning model output 402A with its associated elements 406A, 408A, and 410A. The machine learning model output 402A is generated by the machine learning model (not shown) in response to receiving an assigned task, also referred to as a use case, and represents the machine learning model's solution to the assigned task. By way of example, elements 406A, 408A, and 410A represent characteristics of a machine learning model's output such as the steps the machine learning model executed to accomplish a task, the resources used by the machine learning model to execute a task, and descriptions of the machine learning model's logic executing particular steps.

Task data 404A represents actions taken by a past machine learning model or a user in executing a task similar to that assigned to the machine learning model. Elements 412A, 414A, and 416A represent the steps the user executed to accomplish the task, the resources used by the user, and descriptions of the user's logic in using resources and the user's logic in steps executed by the user.

FIG. 4A shows that the machine learning model 402A and the task data 404A deviate at element 3A 410A and element 3B 416A. For example, the deviation in element 3A 410A and element 3B 416A may be different steps taken by the machine learning model and the user in reaching the solution, such as the user determining to issue a refund to a customer in response to a customer's email discussing an issue with a product, and the machine learning model determining to forward the customer's email to a quality assurance department of the enterprise.

FIG. 4B illustrates the generation of annotation 416B which is a textual description of the differences between element 3A 410B and element 3B 416B. In continuing the example above, the annotation may include a textual description of the differences between the user issuing the refund and the machine learning model output of forwarding the customer to the quality assurance department. The annotation may include textual description of the logic of the user and the machine learning model, including keywords from the customer email. The adversarial annotation system may store the annotation 416B with both the task data 404B and the output 402B in a database. In other examples, the annotation 416B may be stored separately from the output 402B and task data 404B and with other annotations (not shown) to allow for construction of training datasets comprised of the annotations.

Method of Training the Machine Learning Model

Figure 5:
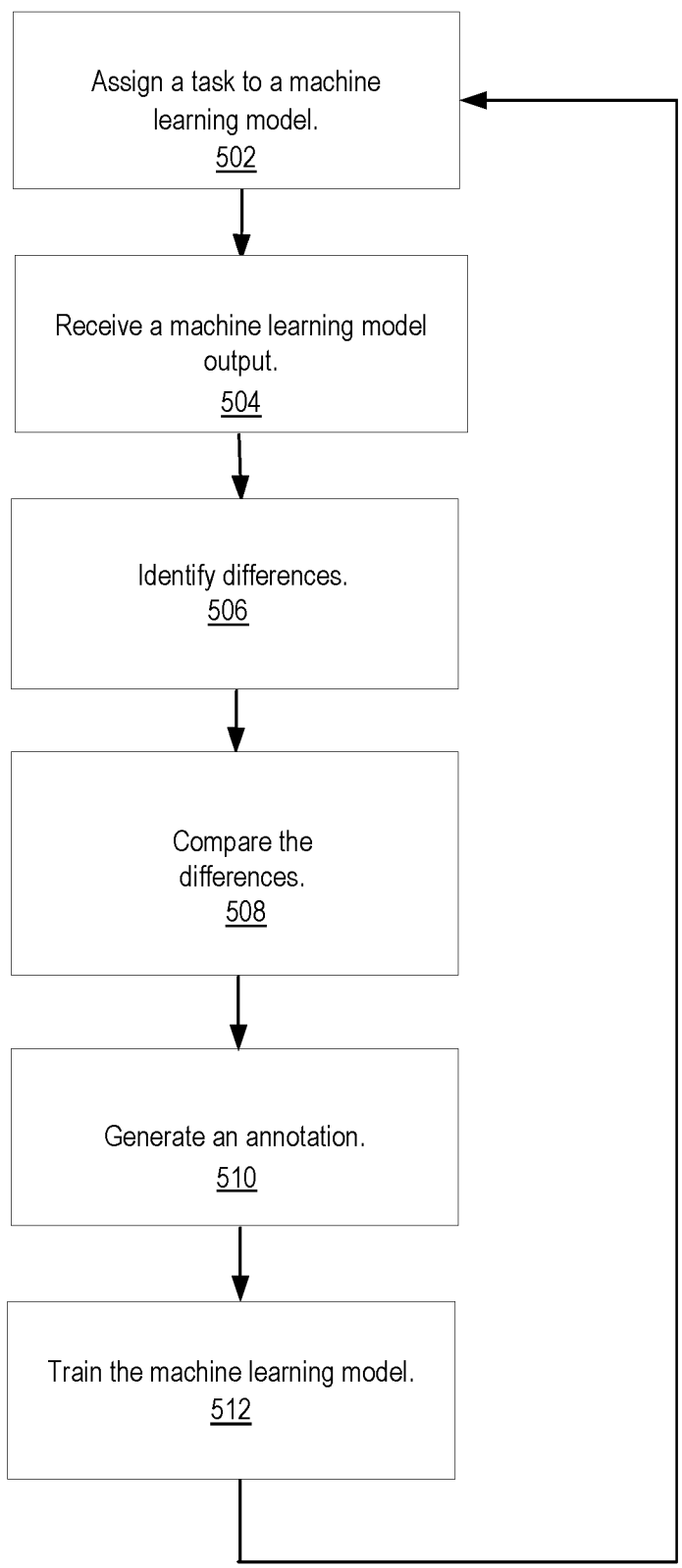
FIG. 5 illustrates a flow chart for an example method of operating an adversarial annotation system, particularly illustrating continually training the machine learning model on the generated annotations and updating past training datasets according to one embodiment.

FIG. 5 is a flowchart showing illustrative method 500 for training the machine learning model of an adversarial annotation system.

At block 502 the machine learning model receives an assigned task from a user. For example, the task may be to sort through a dataset of emails to identify phishing attempts, such as by using Natural Language Processing (NLP) to identify grammatical errors in the email, emails from non-enterprise email addresses, or emails with URL links.

At block 504, the machine learning model generates an output associated with the assigned task. In the example of phishing attempts, the output may be a list of emails that are phishing attempts including a textual description of why the emails are phishing attempts.

At block 506, the method includes identifying differences in detailed analysis of the machine learning model output, task data, and data associated with the assigned task; contradictions between the machine learning model output, task data, and data associated with the assigned task; and detailed results of the machine learning model output, task data, and data associated with the assigned task. At block 508, the adversarial annotation system may compare differences in analysis, contradictions, and results from the machine learning model output with the task data using Natural Language Processing (NLP). The adversarial annotation system may further compare the detailed analysis, contradictions, and detailed results of the output and task data to a preset database of detailed analysis, contradictions, and detailed results to identify similar past tasks and to identify enterprise procedures and regulations. For example, the enterprise may have procedures in place to filter out phishing emails by flagging emails requesting a transfer of money or gift cards. The adversarial annotation system may compare the machine learning model's output and the task data to the preset database of detailed analysis, contradictions, detailed results and enterprise procedures to confirm that both the user and the output follow the enterprise rules. The database may further store information associated with changes made to information stored in the database. For example, the database may store records of employee audits to the database and create audit trails of the changes.

At block 510, the method includes generating an annotation. The annotation may be a textual description of differences between the machine learning model output and the task data.

At block 512, the adversarial annotation system may train the machine learning model based on the annotation. For example, the adversarial annotation system may input the annotation as training data into the machine learning model and use a second assigned task to repeat the method 500 at step 502 by using the machine learning model further trained using the annotation to produce a second output.

In some examples, the second assigned task may relate to a past task a user assigned to the machine learning model. In some examples, the adversarial annotation system may iteratively cycle through past assigned tasks to reinput into the retrained machine learning model to produce updated annotations. In doing so, the adversarial annotation system may retrace past outputs to cure training datasets of past mistakes or to update training sets with new enterprise rules. For example, the enterprise's training data to the machine learning model may indicate that the machine learning model should respond to all customer complaints with a form email apology. Changes in enterprise rules may now require that all customer complaints be instead forwarded to a customer retention department. The machine learning model may use an annotation with the updated enterprise rule to update the training dataset.

Example Advantages of the Adversarial Annotation System

The adversarial annotation system is useful for businesses because it allows for efficient training of machine learning models and the efficient generation of training data sets. Training machine learning models is a labor intensive and expensive endeavor. User generation of annotations may be prone to errors and may introduce the sub-conscious biases of the person into the training data. The inclusion of biases in the training data reduces the quality of the machine learning model output by skewing the output with respect to these biases.

Further, because enterprises generally rely on teams of people to generate training data, training datasets are prone to logical inconsistencies because of differences in opinions or generation of training data sets is generally the result of a team of people, the training datasets are prone to include logical inconsistencies because the people constructing the training datasets may have different criteria by which they review the data.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method comprising:
    assigning, in parallel to a group of processors and to improve time efficiency of the group of processors, a task to a machine learning model and the task to a user;
    receiving a first output from the machine learning model associated with the task, wherein the first output comprises a first description associated with a logic of the machine learning model utilized in performing the task;
    receiving a second output from the user associated with the task, wherein the second output comprises a second description associated with a logic of the user utilized in performing the task;

comparing the logic of the machine learning model and the logic of the user to determine one or more logical inconsistencies; and generating, responsive to determining the one or more logical inconsistencies, an annotation, wherein the annotation is a textual description indicating the logic of the user and the logic of the machine learning model; and retraining the machine learning model using the annotation, wherein retraining includes using a feedback loop that continues until an updated output of the machine learning model falls within a predetermined tolerance of error.

2. The method of claim 1, wherein the textual description includes a description of differences between the first output of the machine learning model and the second output.

3. The method of claim 1, wherein the task comprises determining whether a transcript or voice recording comprises a complaint.

4. The method of claim 1, wherein retraining the machine learning model comprises:
quantifying a number of differences between the logic of the user and the logic of the machine learning model; and
retraining the machine learning model until the number of differences satisfies a preset threshold.

5. The method of claim 1, wherein comparing the logic of the user and the logic of the machine learning model includes using Natural Language Processing to identify words matching a preset library.

6. The method of claim 1, further comprising:
storing the annotation in a database of annotations based on the task associated with the annotation.

7. A non-transitory computer readable medium comprising instructions that when executed by one or more processors cause the one or more processors to:
assign, in parallel to a group of processors and to improve time efficiency of the group of processors, a task to a machine learning model and the task to a user;
receive a first output from the machine learning model associated with the task, wherein the first output comprises a first description associated with a logic of the machine learning model utilized in performing the task;
receive a second output from the user associated with the task, wherein the second output comprises a second description associated with a logic of the user utilized in performing the task;
compare the logic of the machine learning model and the logic of the user to determine one or more logical inconsistencies; and
generate, responsive to determining the one or more logical inconsistencies, an annotation, wherein the annotation is a textual description indicating the logic of the user and the logic of the machine learning model; and
retrain the machine learning model using the annotation, wherein retraining includes using a feedback loop that continues until an updated output of the machine learning model falls within a predetermined tolerance of error.

8. The non-transitory computer readable medium of claim 7, wherein the textual description includes a description of differences between the first output of the machine learning model and the second output.

9. The non-transitory computer readable medium of claim 7, wherein the task comprises determining whether a transcript or voice recording comprises a complaint.

10. The non-transitory computer readable medium of claim 7, wherein retraining the machine learning model comprises:
quantifying a number of differences between the logic of the user and the logic of the machine learning model; and
retraining the machine learning model until the number of differences satisfies a preset threshold.

11. The non-transitory computer readable medium of claim 7, wherein comparing the logic of the user and the logic of the machine learning model includes using Natural Language Processing to identify words matching a preset library.

12. The non-transitory computer readable medium of claim 7, further comprises:
storing the annotation in a database of annotations based on the task associated with the annotation.

13. A system comprising:
one or more processors; and
a memory that stores instructions that, when executed by one or more processors, cause the one or more processors to:
assign, in parallel to a group of processors and to improve time efficiency of the group of processors, a task to a machine learning model and the task to a user;
receive a first output from the machine learning model associated with the task, wherein the first output comprises a first description associated with a logic of the machine learning model utilized in performing the task;
receive a second output from the user associated with the task, wherein the second output comprises a second description associated with a logic of the user utilized in performing the task;
compare the logic of the machine learning model and the logic of the user to determine one or more logical inconsistencies; and
generate, responsive to determining the one or more logical inconsistencies, an annotation, wherein the annotation is a textual description indicating the logic of the user and the logic of the machine learning model; and
retrain the machine learning model using the annotation, wherein retraining includes using a feedback loop that continues until an updated output of the machine learning model falls within a predetermined tolerance of error.

14. The system of claim 13, wherein the textual description includes a description of differences between the first output of the machine learning model and the second output.

15. The system of claim 13, wherein the task comprises determining whether a transcript or voice recording comprises a complaint.

16. The system of claim 13, wherein retraining the machine learning model comprises:
quantifying a number of differences between the logic of the user and the logic of the machine learning model; and
retraining the machine learning model until the number of differences satisfies a preset threshold.

17. The system of claim 13, wherein comparing the logic of the user and the logic of the machine learning model includes using Natural Language Processing to identify words matching a preset library.

* * * * *